Figure 1:
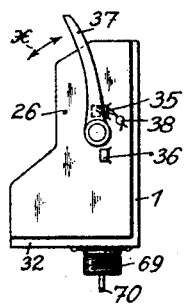

March 17, 1931.　　　　H. HEINZ　　　　1,796,653

FARE INDICATOR

Filed Feb. 13, 1928　　　2 Sheets-Sheet 1

Inventor:
HANS HEINZ
by:
Attorneys.

March 17, 1931.  H. HEINZ  1,796,653
FARE INDICATOR
Filed Feb. 13, 1928    2 Sheets-Sheet 2
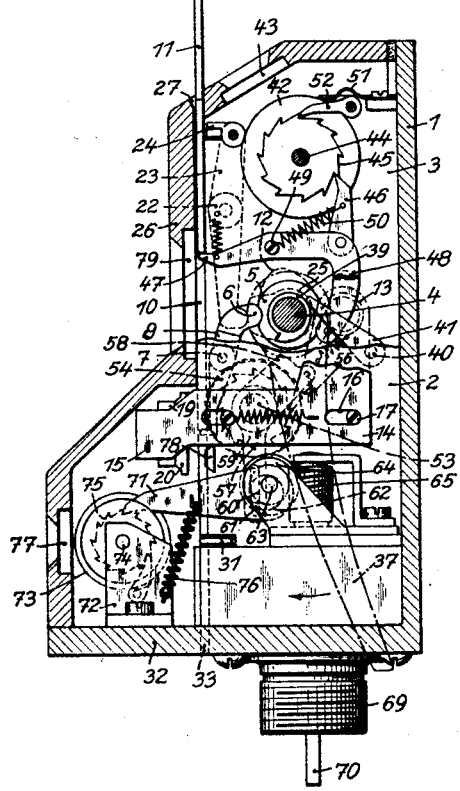
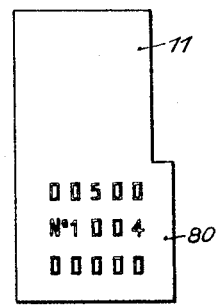
Inventor:
HANS HEINZ
by:
Attorneys.

Patented Mar. 17, 1931

1,796,653

UNITED STATES PATENT OFFICE

HANS HEINZ, OF VILLINGEN, GERMANY, ASSIGNOR TO KIENZLE UHRENFABRIKEN AKTIENGESELLSCHAFT, OF SCHWENNINGEN, GERMANY, A CORPORATION OF GERMANY

FARE INDICATOR

Application filed February 13, 1928, Serial No. 254,130, and in Germany February 14, 1927.

My invention relates to improvements in registering mechanisms, and the object of the improvements is to provide a mechanism of this type for controlling the length of way made by a car and covered by impost or insurance taxes or the like to be raised in accordance with the length of way made by the car. When calculating the impost or insurance taxes by means of an apparatus of this kind provision must be made that the tax department or the insurance company is not cheated through tampering with the parts of the mechanism used for registering the length of way. To this end the apparatus is constructed so that any fraud can be directly ascertained from the indications made on the control strips or cards. For this purpose a controlling member projecting through the wall of the casing of the registering mechanism is provided, by the operation of which the number of the units of the length of way made by the car is recorded at the beginning and at the end of the length of way covered by the impost or insurance tax by means of printing mechanism operatively connected with a registering or odometer mechanism driven by the vehicle and mounted within the apparatus, the controlling strip or cord being released and ejected from the casing only after having printed thereon both the initial and final numbers of the odometer mechanism. Upon the insertion of a controlling card, which represents the payment of the insurance tax or impost for a certain distance, the said controlling member is first operated to record the reading of the odometer on such card, the length of way made by the car. Preferably, on the said controlling card the entire length of way for which the impost or insurance tax has been paid is recorded. Such controlling cards can be purchased for example in public sales offices, from tax collectors, and the like, and they are inserted into the controlling apparatus at the beginning of the insurance of the car. Thereafter the controlling member projecting from the casing is operated for printing on the said card the number registered on the odometer and indicating the beginning of the insurance. While the car drives through the length of way covered by the said impost or insurance card the section of the controlling strip remains within the apparatus and it can be removed therefrom only after the length of way covered by the insurance or impost has been made and the controlling member has been operated for recording the new indication of the odometer on the card, which indication shows the length of way made by the car.

For renewing the impost or the insurance the controlling card is ejected, and a new card is inserted into the printing mechanism of the apparatus, whereupon the indication of the registering mechanism is printed on the new card, the said indication registering, for the new card, the initial position of the odometer.

If the said initial position of the odometer has been printed on the second card immediately after ejecting the first card, the new initial position of the odometer printed on the new card is the same as the final position of the odometer printed on the ejected card. If, however, the car has been in operation within the period of time after ejecting the old impost card and inserting the new controlling card into the printing mechanism, and if therefore the car has been operated without an impost or insurance tax having been paid, this fraud can be directly ascertained from the difference between the final position of the odometer printed on the first card and the initial position of the odometer printed on the second card. Thus, by comparing all the controlling strips showing the initial and end positions of the odometer the official can find out whether or not the vehicle has been in operation without having an impost or insurance card placed in the registering mechanism. Therefore the amount of the impost or the insurance tax which has not been printed by means of the controlling apparatus can be calculated and collected.

Figure 2:
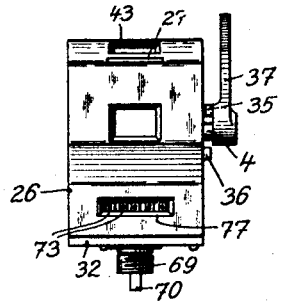
Figure 3:
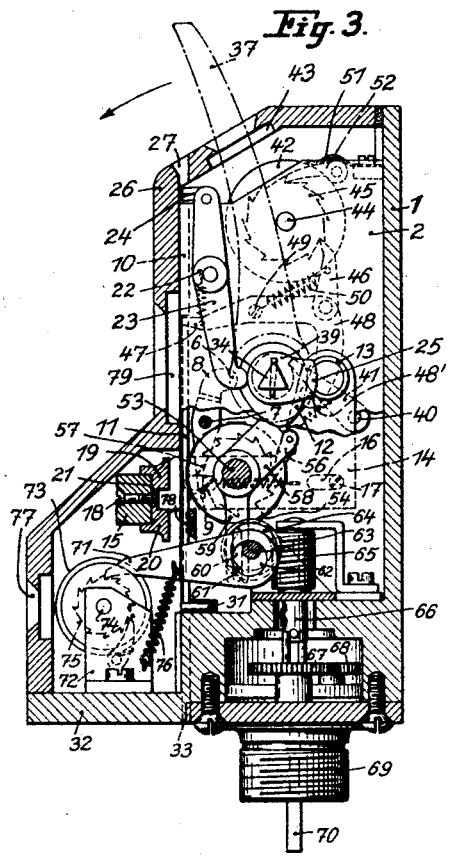
Figure 4:
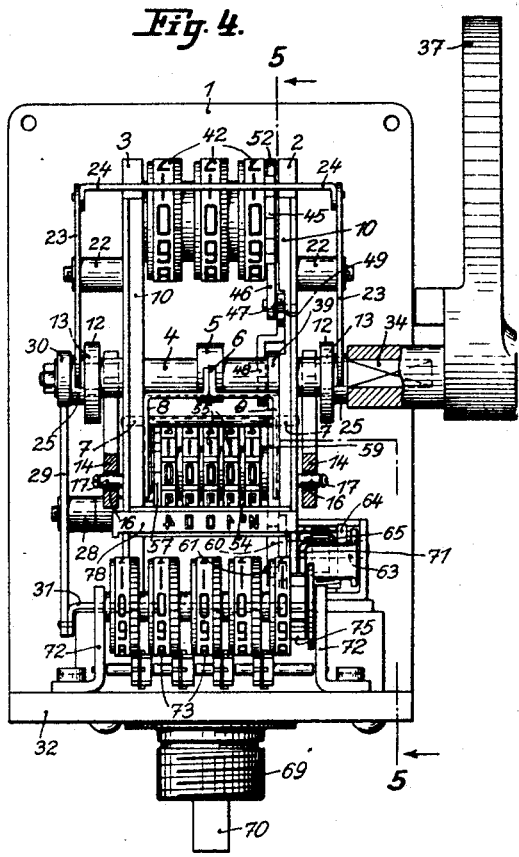

For the purpose of explaining the invention an example embodying the same has been shown in the accompanying drawings in which the same letters of reference have been used in all the views to indicate corresponding parts. In said drawings, Fig. 1, is an elevation showing the apparatus, Fig. 2, is an elevation looking from the left in Fig. 1, Fig. 3, is a sectional elevation of the apparatus, some of the parts of the mechanism being broken away, Fig. 4, is an elevation looking from the left of Fig. 3, the front wall of the casing being removed, Fig. 5, is a sectional elevation taken on the line 5—5 of Fig. 4, and Fig. 6, shows the controlling card used in the apparatus.

In the example shown in the figures the apparatus comprises a casing 1 provided internally with two walls 2, 3 disposed parallel to each other and providing bearings for the parts of the mechanism.

In the said walls 2, 3 a main driving shaft 4 is rotatably mounted, which controls the various parts of the mechanism. The said shaft carries a cam 5 cooperating with one end 6 of a bifurcated lever 8 rockingly mounted on a shaft 7, the bifurcated bottom ends of the said lever being formed with laterally directed lugs 9.

When starting the operation of the mechanism, the said lugs 9 engage in longitudinal slots 10 made in the partition walls 2, 3 and providing guides for the controlling card 11 shown in Fig. 6.

Further, at opposite sides of the partition walls 2, 3 a cam 12 is fixed to the driving shaft 4, and each of the said cams 12 cooperates with a bolt 13 fixed to each arm 14 of a supporting member 15 connecting the walls 2, 3. The arms 14 of the member 15 are provided with slots 16 engaged by pins 17 fixed to the partition walls 2, 3 and providing guides for the supporting member 15, which supporting member is movably mounted.

By means of a screw 18 a stamp 21 provided with two pressing jaws is fixed to the member 15. The object of the said stamp will be described hereinafter.

Above the main driving shaft 4 pivot bolts 22 are fixed to the outer sides of the partitions 2, 3, and on the said pivot bolts levers 23 are rockingly mounted, which are connected at their top ends by a bail 24. The bottom ends of the levers 23 cooperate with cams 25 fixed to the main driving shaft 4.

The cams 25 are fixed to the main driving shaft 4 in such positions that in the position of the parts shown in Fig. 3 the bail 24 is in the path of the slots 10 for the controlling card. Thus a slot 27 made in the lid 26 for inserting the controlling card 11 into the apparatus is closed.

Further, to the outer side of the wall 3 a pivot bolt 28 is fixed on which a lever 29 is rockingly mounted, the top end of which cooperates with a cam disk 30 fixed to the main driving shaft 4. The bottom end of lever 29 is connected with a bail 31 which in the position of the parts shown in Fig. 3 projects into the bottom part of the guide slots 10 for the card 11, thus closing an opening 33 made in the bottom plate of the casing for ejecting the card. The end of the main driving shaft 4 projecting through the lid 26 of the apparatus is formed with a triangular stud 34 on which an operating lever 37 is removably mounted, which can be rocked in the direction of the arrow x shown in Fig. 1 between two lugs 35 and 36. This lever may be so mounted on the shaft 4 that it is removable only when the shaft is in operative position.

The operating lever 37 is provided with locking means preventing the same to be removed or operated by non-authorized persons. To show what may be done, a lead seal 38 has been illustrated in Fig. 1.

To the main driving shaft a locking cam 39 is fixed, which cooperates with a locking lever 41 rockingly mounted on a pivot bolt 40.

Between the top ends of the walls 2, 3, a counting or registering mechanism comprising figure wheels 42 is mounted, which registering mechanism may have any known or preferred construction. The figures indicated by the said registering mechanism are displayed through a slot 43 made in the lid 26 of the casing. To the shaft 44 carrying the figure wheels 42 a rachet wheel 45 is fixed which is acted upon by a pawl 46 mounted on a lever 47, 48 rockingly mounted on a shaft 49 fixed to the wall 2, a spring 50 provided on the shaft 49 of the lever 47, 48 pressing the pawl 46 into engagement with the rachet wheel 45.

A locking pawl 52 acted upon by a leaf spring 51 is provided for preventing accidental backward movement of the figure wheels 42. To the arm 48 of the lever 47, 48 a pin 48′ is fixed, which cooperates with the locking pawl 41.

Further, on a shaft 53 provided between the walls 2, 3 a registering mechanism or odometer 54 is mounted, the figure wheels 55 of which are equipped with types adapted to print figures. The figures of the said wheels disposed in printing position are located opposite to the pressing jaw of 19 of the stamp 21.

The figure wheels 55 of the registering mechanism 54 are rotated by means of a pawl 56 cooperating with a rachet wheel 57 fixed to the shaft 53 of the numeral wheels and jointed to a lever 58, 59 rockingly mounted on the shaft 53. The arm 59 is equipped with a slot 60 providing a guide for a pin 61 carried by an eccentric 62 fixed to the axis 63 of a worm gear 64 engaged by a worm 65. The axis of 66 of the said worm is connected, by gear wheels 67, 68, with a shaft 70 passed through a lug 69 of the casing and adapted to be coupled with a rotary member of the vehicle.

The eccentric 62 cooperates with a pawl 71 adapted to operate a counting mechanism 73 mounted on the base plate 32 of the casing between brackets 72 and cooperating with a ratchet disk 75 mounted on the axis 74 of the counting mechanism 73, a spring 76 being provided for holding the pawl 71 in engagement with the ratchet disk 75. The figures displayed by the counting mechanism 73 can be read through a slot 77 made in the lid 26 of the casing. Below the counting mechanism 54 of the printing apparatus a stamp 78 is fixed, which is provided with a type for printing a controlling sign such for example as the number of the vehicle, the said stamp cooperating with the pressing jaw 20 of the stamp 21. Further, an opening 79 is provided in the lid 26 through which the matter printed on the card 11 inserted into the casing can be read.

The controlling card shown in Fig. 6 is provided at its side with an extension 80 which, when inserting the card through the slots 10, cooperates with the front end of the arm 47 of the lever 47, 48.

The operation of the apparatus is as follows:

When the vehicle carrying the apparatus is in operation, the units of the length of way through which the vehicle is driven, for example kilometers, are indicated by the counting mechanism 73 and by the registering mechanism 54 of the printing apparatus. Thus both mechanisms indicate the same figures. If after driving through a certain length of way, for which the impost or the insurance tax has been paid for the vehicle by means of the card previously inserted into the apparatus, a new card is to be inserted into the apparatus, the lead seal 38 must first be broken, so that the lever 37 can be rocked from the position shown in Fig. 3 into the position shown in Fig. 5.

By the rocking movement thus imparted to the main driving shaft 4 at first the printing stamp 21 is pressed by means of the supporting member 15 and the cam 12 cooperating with the arms 14 thereof is pressed on the card which is still within the casing, and the said card is pressed on the types of the counting mechanism 54 and the stamp 78 which are in printing position. Therefore the controlling figure corresponding to the number of the vehicle and the figure indicating the length of way so far made by the vehicle are printed on the controlling card supported on the bail 31.

When further rocking the operating lever 37 downwardly the exit opening 33 is laid open by the bail 31 controlled by the lever 29 and the cam disk 30, so that the card 11 is ejected from the controlling apparatus downwardly. Thereafter the lugs 9 of the locking lever 8 are moved by means of the lug 5 into the path of the controlling card 11 guided by the guide slots 10. Simultaneously the slot 27 for inserting a new card is released by the bail 24, the arms 23 controlling the said bail being engaged by the cams 25 carried by the main driving shaft 4.

In this position of the parts the main driving shaft 4 is locked by means of the locking cam 39 and the locking lever 41. For releasing the main driving shaft a new card 11 is inserted into the apparatus through the slot 27. On the rear face of the said card the length of way for which for example the insurance tax has been paid by purchasing the said card may be printed, and the figure indicating the said length of way can at any time be inspected through the opening of 79 after inserting the card 11. When inserting the card into the slots 10, its lateral extension 80 cooperates with the front end of the arm 47 of the lever 47, 48, so that the lever is rocked in anti-clockwise direction about its axis 49. Thus the pawl 46 carried by the arm 48 advances the counting mechanism 42 an amount which corresponds to the number of the units of the length of way (kilometers) insured by the new card or bears a definite relation thereto. The number to be set up in the registering mechanism 42 may, for example, be 1, 2, 3, 4 . . . 42, 43 . . . etc.; if the unit lengths of way insured by the new cards are, for example, 42, 500 kilometers or miles, etc. long, the number set up will be "42500," or, in order to employ a simpler mechanism, only the number 425 will be so set up. The length of way insured by the new card can at any time be read through the opening 43.

As soon as the lower margin of the newly inserted card 11 has engaged the lugs 9 of the locking lever 8 the arm 47 of the lever 47, 48, which so far was locked by the extension 80 of the card, is released.

In the meantime the operating lever 37 has been rocked into the position shown in Fig. 5 in dotted lines, and it is now returned into initial position by being rocked in the direction of the arrow shown in Fig. 5. Now the printing mechanism is again operated, so that the figures of the counting mechanism 54 of the printing apparatus are printed on the card 11 near the lower margin thereof. If in the meantime the vehicle has not been moved, the said figure is the same as that printed on the old card before ejecting the same, so that both figures indicate the units of the length of way (kilometers) from which the new insurance or the paying of the impost begins. When further returning the operating lever 37 into initial position the bail 31 is removed into position for closing the opening 33. Thereafter the lugs 9 of the locking lever 8 are retracted away from the path of the card 11, so that the new card can fall into the lower end position controlled by the locking bail 31. After the main driving shaft 4 has been returned into the initial position shown in Fig. 3, the slot 27 for inserting the card is closed by the lever 23, so that the parts of the mechanism used for registering the length of way made by the vehicle can not be affected any more.

From the controlling cards having the units of way printed theron in the manner described, the officials can at any time ascertain whether or not the vehicle has been driven in the course of the total length of way registered by the mechanism without the impost or insurance tax having been paid. Therefore, the amounts which have not been paid can now be collected. The owner of the vehicle can at any time ascertain by means of the registering mechanisms 42 and 73, if the total length of way covered by the controlling cards has been attained, and what length of way paid for by the cards can still be made.

In lieu of the controlling cards 11 a plurality of cards or continuous controlling strips may be used, which are automatically fed to the printing mechanisms of the apparatus and are ejected after being printed upon.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. A registering mechanism for recording upon a card or series of cards the distance traversed by a vehicle covered by impost or insurance taxes or the like, comprising a casing, an odometer mechanism in said casing adapted to be driven from the vehicle, printing mechanism associated with said odometer mechanism and adapted to print the initial and final odometer readings upon a card inserted into the registering mechanism, a controlling member outside said casing operable at the beginning and at the end of the tax-paid distance to actuate said printing mechanism, said printing mechanism being so disposed within said casing that the card is completely enclosed within the casing during the interval between the initial and final printing, means for retaining said card within said registering mechanism, and means operable after the final odometer reading has been printed on said card to render said retaining means inoperative.

2. A registering mechanism as set forth in claim 1, including a shaft operatively connected with the controlling member, the printing mechanism and the lastmentioned means being operatively connected to said shaft.

3. A registering mechanism as set forth in claim 1, including a shaft operatively connected with the controlling member, said casing having a card inlet opening at the top thereof and a discharge opening at the bottom thereof, and a locking member controlled from said shaft and moveable into the path of a new card when the retaining means is rendered inoperative to permit discharge of a previous card through said discharge opening, said locking member being arranged to hold the card in position to have the initial odometer reading printed thereon, and movable out of such path to permit the new card to drop into position to have the final odometer reading printed thereon.

4. A registering mechanism as set forth in claim 1, wherein said printing mechanism comprises two connected jaws, the registering mechanism including a stamp provided with a controlling sign, a shaft connected to the controlling member, and a connection between said shaft and said jaws whereby upon rocking of the shaft said jaws are simultaneously pressed toward the odometer and said stamp.

5. A registering mechanism as set forth in claim 1, in which said casing is provided with an entrance and an exit slot for the card, said registering mechanism including a shaft operated by the controlling member, and means for closing said entrance slot operable from said shaft, said retaining means closing said exit slot and likewise operable from said shaft.

6. A registering mechanism as set forth in claim 1, in which said casing in provided with an entrance and an exit slot for the card, means for closing said entrance slot, a locking member movable into the path of said card to hold the same in position to have the initial odometer reading printed thereon, and means operable after said locking member has been moved into operative position to release said closing means.

7. A registering mechanism as set forth in claim 1, including a counting mechanism, a window slot in the casing adjacent said mechanism, and pawl and ratchet mechanism, adapted to be actuated by a card upon the insertion thereof, to operate said counting mechanism.

In testimony whereof, I hereunto affix my signature.

HANS HEINZ.